United States Patent

Kirkman

[11] Patent Number: 5,178,000
[45] Date of Patent: Jan. 12, 1993

[54] COVER

[75] Inventor: Brian G. Kirkman, Painswick, England

[73] Assignee: Dowty Aerospace Gloucester Limited, Gloucester, England

[21] Appl. No.: 698,908

[22] Filed: May 13, 1991

[30] Foreign Application Priority Data

May 12, 1990 [GB] United Kingdom ............... 9010705

[51] Int. Cl.[5] .......................................... G01M 19/00
[52] U.S. Cl. .................................................... 73/116
[58] Field of Search ............... 73/116, 117.1; 416/61, 416/246, 247 R, 247 A; 415/118, 182.1, 208.1, 203

[56] References Cited

U.S. PATENT DOCUMENTS

| | | |
|---|---|---|
| 3,699,873 | 10/1972 | Irvin . |
| 4,202,296 | 5/1980 | Nonnenmann et al. ......... 415/208.1 |
| 4,406,581 | 9/1983 | Robb et al. . |
| 4,515,071 | 5/1985 | Zach . |
| 4,691,561 | 9/1987 | Ganz et al. .......................... 73/117.1 |
| 5,078,574 | 1/1992 | Olsen .................................. 415/182.1 |

FOREIGN PATENT DOCUMENTS

| | | | |
|---|---|---|---|
| 309698 | 4/1929 | United Kingdom ................. 416/246 |
| 1394192 | 5/1975 | United Kingdom ................. 415/182 |
| 2081382 | 2/1982 | United Kingdom . | |
| 2088570 | 6/1982 | United Kingdom ................... 73/116 |
| 2151704 | 7/1985 | United Kingdom . | |

Primary Examiner—Robert Raevis
Attorney, Agent, or Firm—Young & Thompson

[57] ABSTRACT

A cover provided for covering a bladed rotor during a testing operation. The cover has a face plate of solid sheet like material having a centrally positioned orifice through which air is drawn by the action of part of blade adjacent to orifice. The remaining part of the blades is in a stalled condition and therefore relatively unloaded. The power required to turn the rotor is therefore reduced in comparison to that required if the cover was not present making testing easier. The cover also acts as a safety shroud preventing personnel coming into contact with the blades as they rotate and containing the rotor in the event of its disintegration.

7 Claims, 2 Drawing Sheets

COVER

BACKGROUND OF INVENTION

This invention relates to a cover for use in the testing of turbine equipment having a bladed rotor, in particular, in the testing of ram air turbines in situ on aircraft.

Ram air turbines conventionally comprise a main body which is attached to an arm and deployed, when required, by an actuator. The main body includes a bladed rotor including at least two blades, and a hydraulic pump which in normal operating conditions is powered by the rotation of the bladed rotor.

Conventionally such ram air turbines are ground tested by powering the hydraulic pump so that it acts as a hydraulic motor and thereby driving the bladed rotor. In order to appropriately test the ram air turbine it is necessary to drive it at its normal operational speed, typically in the region of 4000-6000 r.p.m.

As civilian aircraft have developed and grown in size, the power requirement and therefore the size of the bladed rotor on the ram air turbine has correspondingly grown. The power input required to drive the ram air turbine under test is very large and has dramatically increased as the size of the ram air turbine has increased.

It has now reached the stage where the power input requirement for ground testing has become a problem.

The present invention is concerned with reducing the power input requirement under testing of turbine equipment having a bladed rotor.

BRIEF SUMMARY OF THE INVENTION

In its broadest aspect, the present invention comprises a cover for use in the testing of turbine equipment having a bladed rotor, which cover includes:
a face plate positioned so that in use any air drawn by the bladed rotor during testing encounters the face plate prior to the bladed rotor;
a solidly formed side wall which circumferentially surrounds the bladed rotor, adjacent to the blade tips, of the turbine equipment, and to which the face plate is connected;
and a meshed back plate positioned on the other side of the bladed rotor to the face plate and which is connected to the side wall;
wherein the face plate is designed so that during testing over part of the blade length no air flow exists resulting in this part of the length the blade experiencing stall characteristics, whilst over the remaining part of the blade length air flow exists enabling the turbine equipment to be accurately tested.

A cover made in accordance with the present invention is suitable for use in testing any turbine equipment including a bladed rotor. However the cover was devised, and is particularly suited for use in testing ram air turbines on aeroplanes in situ, i.e. for use in ground testing.

It has been previously proposed that with ram air turbines the bladed rotor should be enclosed in a fully meshed cage. The use of such a cage is for safety reasons only, that is (1) to prevent people from accidentally walking into an operating ram air turbine, and (2) in the case of a bladed rotor failure to catch what debris they could to reduce shrapnel damage. The use of these cages has no effect on the air flow characteristics of the bladed rotor.

A cover made in accordance with the present invention includes the safety features associated with a simple cage, and has the advantage that the power input requirement to test the turbine equipment is significantly reduced, whilst the air flow across the bladed rotor is maintained sufficiently high to enable testing.

The power input requirement of the turbine equipment to reach the required r.p.m. is reduced to a minimum when the bladed rotor of the turbine equipment is completely enclosed, and consequently no flow can be generated by the blades of the bladed rotor. As will be well appreciated by those in the aerospace industry in this condition no testing of the turbine can be effected.

With the present invention a balance is achieved between the reduction in the power input requirement and air flow necessary to enable testing, this normally being achieved by the provision of at least one opening in the face plate to allow the flow of air into the cover.

The actual amount by which the power input requirement is reduced is dependent upon the surface area of the blades of the bladed rotor subjected to stall conditions and the position of this surface area along the length of the blade. As will be well appreciated, for equivalent surface areas subjected to stall conditions the power input requirement will be reduced more for the surface area near the tips of the blades, than for the surface area close to the centre of rotation. This is a simple force balance situation.

Preferably, the part of blade length over which no air flow is induced is in the vicinity of the blade tips.

In one embodiment of the present invention, the opening in the face plate to allow for the flow of air about the blades of the turbine equipment under test is a centrally positioned orifice. In this case, the surface area of the blades subjected to stall conditions is in the vicinity of the blade tips. Therefore, maximum reduction power input requirement is achieved for minimum surface area subjected to stall conditions.

Obviously, the actual amount by which the power input requirement can be reduced, whilst maintaining a valid test condition is dependent upon the actual turbine equipment (Ram Air Turbine) under test. The cover, in particular the face plate, can be designed to cater for most conditions that will be encountered. In one embodiment of the present invention the face plate is connected to one edge of the side wall and the back plate is connected to the other edge.

In an alternative arrangement of the present invention, the face plate is positioned on the side wall slightly inward from the edge, which edge is connected to a meshed front piece which is provided to catch debris in the case of a rotor failure. In this case the face place acts as a form of baffle in order to produce the required flow effects.

Under certain conditions, in addition to the face plate the cover is also provided with baffle plates and/or vanes to further enhance the no flow, and thereby stall, conditions.

Preferably, the opening, or openings, is provided with contouring to enhance the air flow conditions into the cover.

BRIEF DESCRIPTION OF THE DRAWINGS

The invention will now be illustrated by description of an example shown in the accompanying drawings, in which.

DESCRIPTION OF PREFERRED EMBODIMENT

Figure 1:
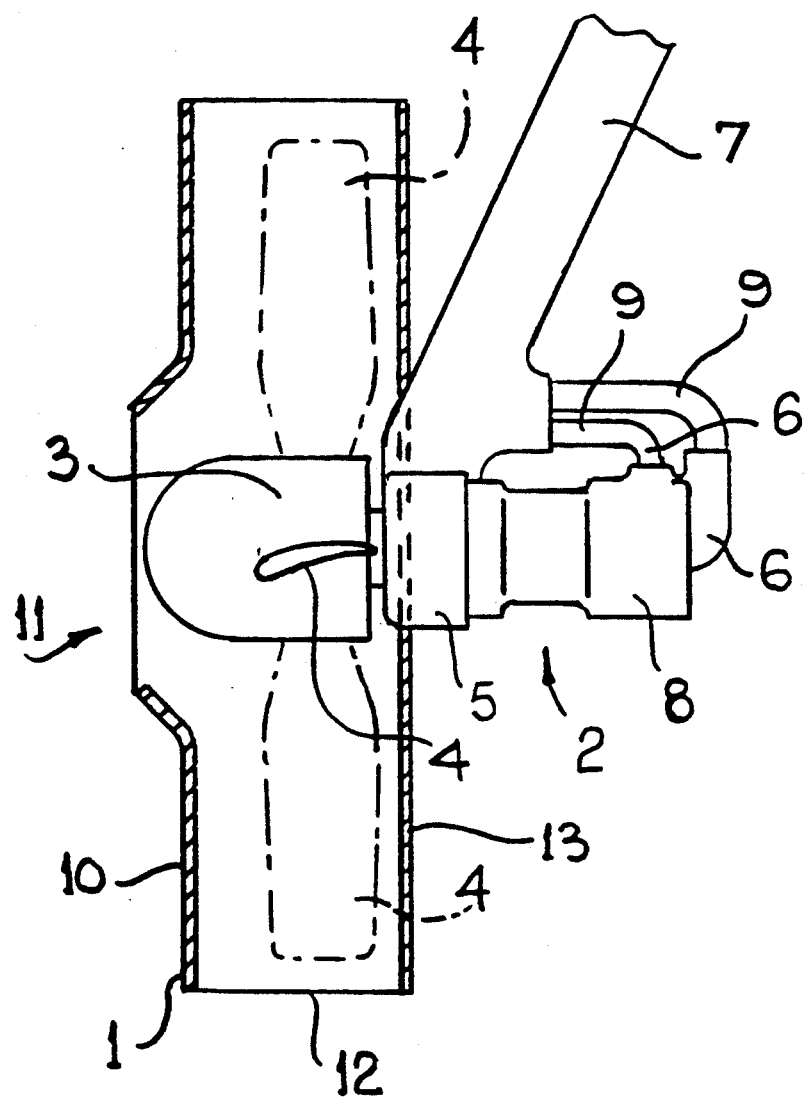
FIG. 1 shows a schematic side view of the cover in place about a ram air turbine.
Figure 2:
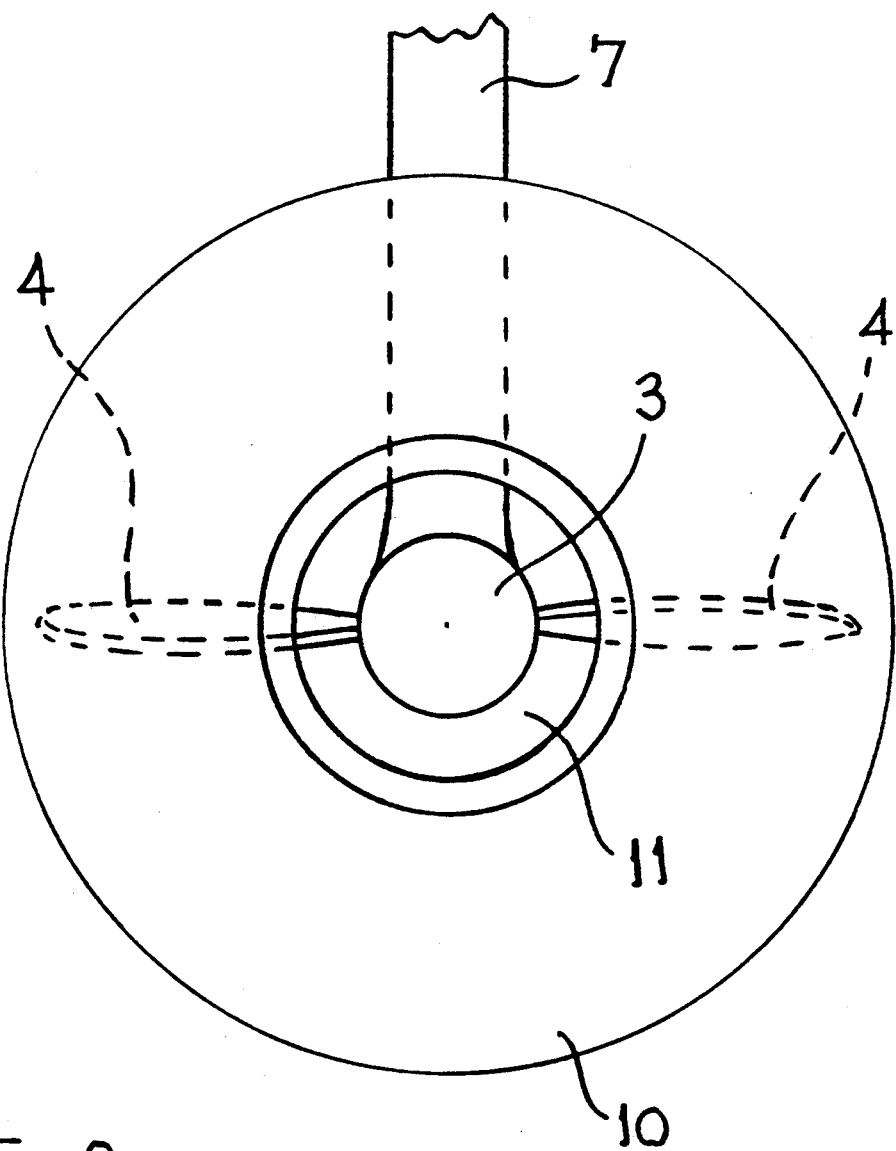
FIG. 2 shows a schematic end view of the cover shown in FIG. 1.

Now referring to the drawings, a cover 1 is located about a ram air turbine 2 having a turbine 3 with blades 4 so that the blades of the turbine 3 will not come into contact with the cover 1.

The ram air turbine 2 comprises:

a main body section 5;

the turbine 3 having two blades 4 diametrically opposing one another and which is attached to the main body section 5;

a hydraulic pump/motor 8 housed within the main body section 5 which is provided with two hydraulic connections 6;

an arm member 7 which has the main body section 5 mounted at one end thereof and which at the other end thereof is connected to an aircraft;

a hydraulic actuator (not shown) which is used to deploy the ram air turbine when required;

and two hydraulic pipes 9 which connect the hydraulic connections 6 and therefore the hydraulic pump/motor 8, with equipment which is to be powered by the hydraulic pump/motor 8.

In normal operational conditions the hydraulic pump/motor 8 acts as a hydraulic pump. In this configuration the blade rotor is caused to rotate by air flow and this rotation is converted to hydraulic energy by the hydraulic pump.

The cover 1 comprises:

a face plate 10 of solid sheet like material having a centrally positioned orifice 11 the edges of which are contoured so as to regulate the flow of air entering the cover;

a side wall 12 of solid sheet like material;

and a meshed back plate 13.

In order to effect ground testing of a ram air turbine using a cover as hereinbefore described, firstly the cover 1 is positioned over the turbine 3 so that the blades 4 of the turbine 3 are not in contact with the cover 1.

In order to power the ram air turbine so as to enable ground testing, the hydraulic pump/motor 8 is hydraulically connected so that it acts as a hydraulic motor rather than a hydraulic pump, and causes the turbine to rotate.

The rotation of the turbine causes air to be drawn into the cover via the orifice 11 in the face plate 10. The face plate 10 in effect limits the air flow into the cover and therefore to the blades 4 of the turbine 3. This means the blades 4 have two opposed flow conditions existing thereon, these are:

a no air flow condition resulting in stall characteristics;

and an air flow condition meaning the blades will behave normally.

The presence of the no air flow condition over a part of the blade 4 means little resistance is met with respect to this part of the blade therefore the power input requirement to drive the bladed rotor at a particular speed (r.p.m.) is lower than would be expected without the presence of the air flow condition.

We claim:

1. In combination with turbine equipment having a bladed rotor, a cover for use in the testing of said equipment, which cover includes:

a face plate positioned so that in use any air drawn by the bladed rotor during testing encounters said face plate prior to the bladed rotor;

a solidly formed side wall which circumferentially surrounds the bladed rotor, adjacent to tips of the bladed rotor, and to which said face plate is connected; and a meshed back plate positioned on the side of the bladed rotor opposite to said face plate and which is connected to said side wall;

wherein said face plate covers a part of said rotor such that during testing over part of the blade length no air flow exists resulting in this part of the length of the blade experiencing stall characteristics, whilst over the remaining part of the blade length air flow exists enabling the turbine equipment to be accurately tested.

2. A cover as claimed in claim 1 wherein said face plate reduces air flow to the blade tips.

3. A cover as claimed in claim 1 wherein said face plate defines at least one opening through which, in use, air flows.

4. A cover as claimed in claim 3 wherein said opening is located centrally in said face plate.

5. A cover as claimed in claim 3 wherein said opening is provided with contouring to enhance the air flow into said cover.

6. A cover as claimed in claim 4, wherein said face plate is imperforate radially outwardly of said opening.

7. A cover as claimed in claim 1 wherein said face plate and said back plate are respectively connected to front and back edges of said side wall.

* * * * *